United States Patent
Hoermansdoerfer

[11] Patent Number: 6,098,479
[45] Date of Patent: Aug. 8, 2000

[54] LINEAR ACTUATOR AND PREFERRED APPLICATION

[76] Inventor: Gerd Hoermansdoerfer, Kastanieneck 6 A, D-31303 Burgdorf, Germany

[21] Appl. No.: 09/073,653

[22] Filed: May 6, 1998

[51] Int. Cl.[7] ............................................. F16H 1/34
[52] U.S. Cl. ..................................... 74/424.8 C; 475/333
[58] Field of Search ....................... 74/424.8 C; 475/168, 475/183, 165, 333

[56] References Cited

U.S. PATENT DOCUMENTS

| | | | |
|---|---|---|---|
| 2,683,379 | 7/1954 | Strandgren | 74/424.8 C |
| 4,375,770 | 3/1983 | Druet | 74/424.8 C |
| 4,576,057 | 3/1986 | Saari | 74/424.8 C |
| 4,620,455 | 11/1986 | Kraus | 475/183 |

FOREIGN PATENT DOCUMENTS 195 11 287 A1  1/1996  Germany.

Primary Examiner—Dirk Wright
Attorney, Agent, or Firm—Pendorf & Cutliff

[57] ABSTRACT

The invention concerns a linear actuator for the conversion of a rapid rotational movement with low moment into a slow linear movement with high force. The concept of a special roller drive of planet gears and two ring wheels makes possible purely theoretically infinitely large reductions with relatively high efficiency. As preferred application of this linear actuator device there is suggested an integration in an electric driven brake system for example for automobiles. The inventive linear actuator is realizable with comparatively small constructional expenditure and in very small construction sizes.

21 Claims, 3 Drawing Sheets

LINEAR ACTUATOR AND PREFERRED APPLICATION

BACKGROUND OF THE INVENTION

1. Field of the Invention

The invention concerns a linear actuator for the conversion of a rapid rotational movement with low moment into a slow linear movement with high force. The most various embodiments of this type of control element are known in the mechanical engineering industry, for example as recirculating ball screw, roller screw drive or planetary threaded pinion/drive.

2. Description of the Related Art

Each of the known embodiments has their specific advantages and/or disadvantages, so that the appropriate selection for each respective application is based as a rule upon the most optimal compromise. Certain applications are known, wherein the existing mechanisms do not achieve a satisfactory constructive solution.

At this time there is being developed, under the widely accepted English term "brake by wire", an electrical braking system for automobiles, which will make the hydraulic system used until now obsolete. This hydraulic system is being replaced with electro-motor drive of the brake calipers. A sensor measures how strong the driver steps upon the brake pedal and reports this measurement to a system control microprocessor, which sends a command from the soles of the shoe of the driver to the motors and the brake calipers. All of this functions more rapidly and precisely then with a hydraulic system. In this case the electronic control can incorporate such functions as anti-lock brake system (ABS) or anti-slip control (ASC) and so significantly simplify the complex brakes in automobiles.

In the conventional development of this type of brake system it has unfortunately been shown, that the electrical drive system formed of a combination of drive motor and transmission cannot, with a more, satisfy the task set to it. In particular the inadequate operational effectiveness, for one part, of the high speed reduction and, for the other part, the working principle associated with the transmission, requires electro-motors of high capacity, in order to achieve the necessary pressure of the brake shoes against the brake disk. For the control of this kind of strong motors an upgrading of the conventional electrical on-board voltage from 12 to 60 volts would be inevitable, since even when using large cable diameters the extremely high current would result in corresponding electrical losses in the electrical system. Besides this, large electro-motors would at the same time be heavy, whereby the unsprung mass of the wheel would be increased in an undesirable manner. It must further be taken into consideration that only a small amount of space is available for installation in the wheel well or, as the case may be, in the area of the suspension, so that bulky aggregates cannot be incorporated therein.

There existed thus in particular for the above described application the task for providing a linear actuator of high force and small stroke, which should be capable of converting the electrical energy into mechanical performance with low loss. The task overall has a high degree of difficulty due to the following necessary requirements:

high operational effectiveness small work space with very high force requirement sufficiently large work stroke for compensation of wear on the brake disk and linings compact construction and low weight resistance to high temperatures and temperature changes resistance to dirt and water absolute reliability vibration stability ease of service and low service requirement low production costs

SUMMARY OF THE INVENTION

The above described task is achieved in accordance with the invention via a special roller drive mechanism which on the basis of a clever concept is capable of satisfying the indicated requirements with virtually no compromise. The inventive roller drive mechanism is based upon the idea, that a translational movement is produced between two bodies with their threading rolling upon each other by setting the relationship between the roller working circles to be uneven to the relationship of the number of thread starts. The conversion of the rotation into a translational movement is then infinitely small, when the two mentioned relationships are equal. In this case the axial displacement is equal to zero. In very small differences there results a corresponding small displacement with high force. With the invention it is further proposed, to transmit the significant axial forces from the rollers directly upon the frame or base, that the other components remain free of axial forces, and the drive (for example in the form of an electrical motor) can be mounted in a fixed position on the frame.

DETAILED DESCRIPTION OF THE INVENTION

Figure 1:
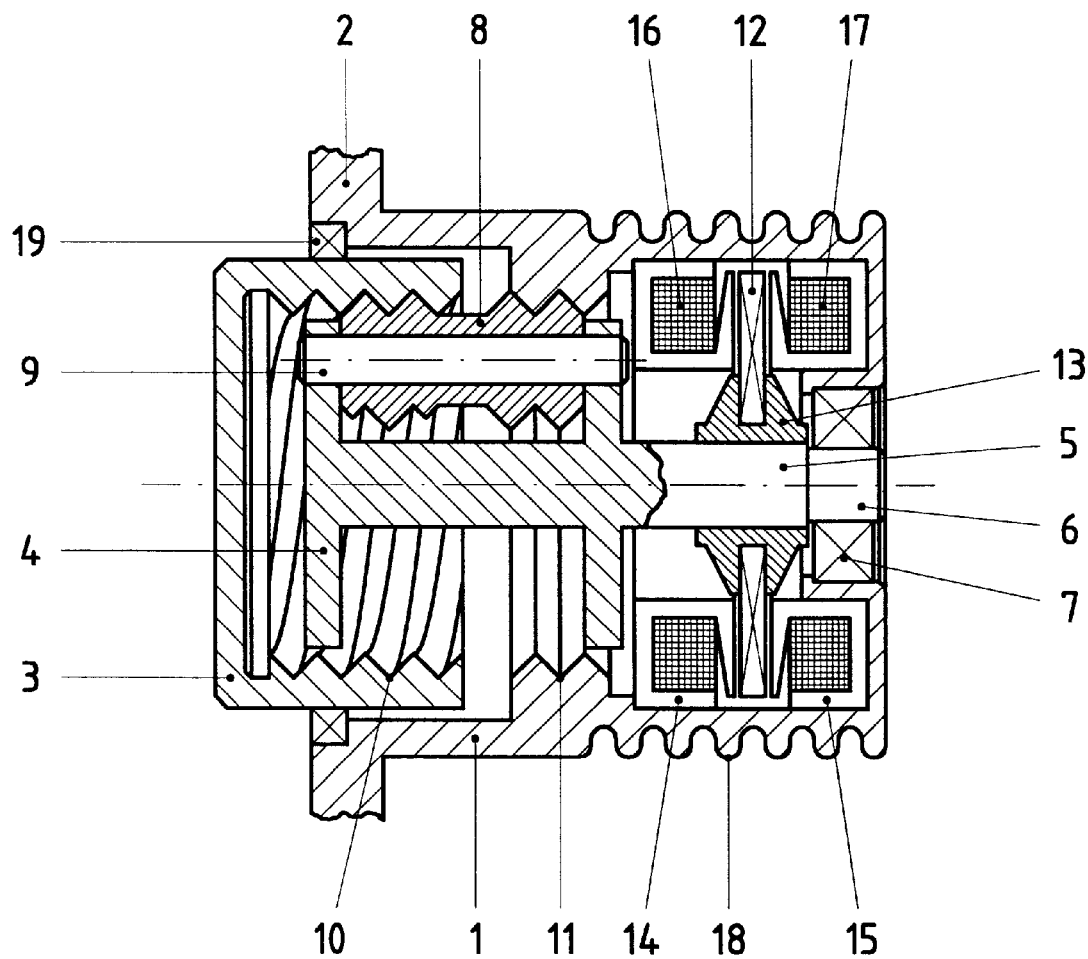
FIG. 1 shows an inventive assembly in partial section.

The illustrative embodiment of the control element according to FIG. 1 comprises a housing 1 with a flange like step or shoulder 2 for connecting with the brake caliper of a disk brake. The inner area of the housing 1 can be separated into two sections, of which the first, shown here on the left side, houses the roller drive mechanism while the second, shown here on the right side, serves for receiving the electrical drive motor. In the housing 1 circumscribing notches are provided, in order to produce cooling fins 18 for improved heat removal.

In the housing, on the left, there is situated an axially moveable piston 3, which with its face surface either directly or via a transverse force coupling, (for example, roller) can act upon the frame carrier of the brake shoe. The piston is situated in the shown embodiment with a radial separation from the housing. Both parts are sealed with respect to each other by a seal 19 in order to minimize the penetration of dirt and moisture. On the inner side of the piston there is provided an internal threading 10 with an in this case three start thread. In this internal threading there can revolve multiple (for example three) special planet rollers with their single start thread, from which only the planet roller 8 is illustrated in order not to block the view to the inner details of the roller pinion. The planet roller 8 is secured or mounted in a cage or housing 4 via a bolt 9. In this type of mounting roller bodies, for example, needle rollers, can be integrated for the purpose of further reduction of friction. The cage or housing transitions towards the right to a shaft 5, of which the projection 6 is housed in a roller bearing 7 in the housing 1. The special planet rollers (8) which are supported in the cage 4 are subdivided in the axial direction, wherein the left area is provided with threadings and the right with circumferential ribs or as the case may be notches. These ribs or notches which circumscribe without flank lead roll in a rib or notch collective 11 of the housing 1. In the drawing the flanks of the respective teeth of the threaded as well as of the ribbed part of the roller drive are set for the example at approximately 45°, a value which is conventional, for example, for threaded roller spindles. For the general function of the inventive unit the flank angle is of secondary importance. It does however appear to be advantageous to provide flanks which roll upon each other with a convex contour, in order to realize under pressure somewhat elliptic contact surfaces of the roller partners. The electro-motor drive situated in the right housing area in the illustrative embodiment is common for the three illustrative embodiments described below.

Figure 2:
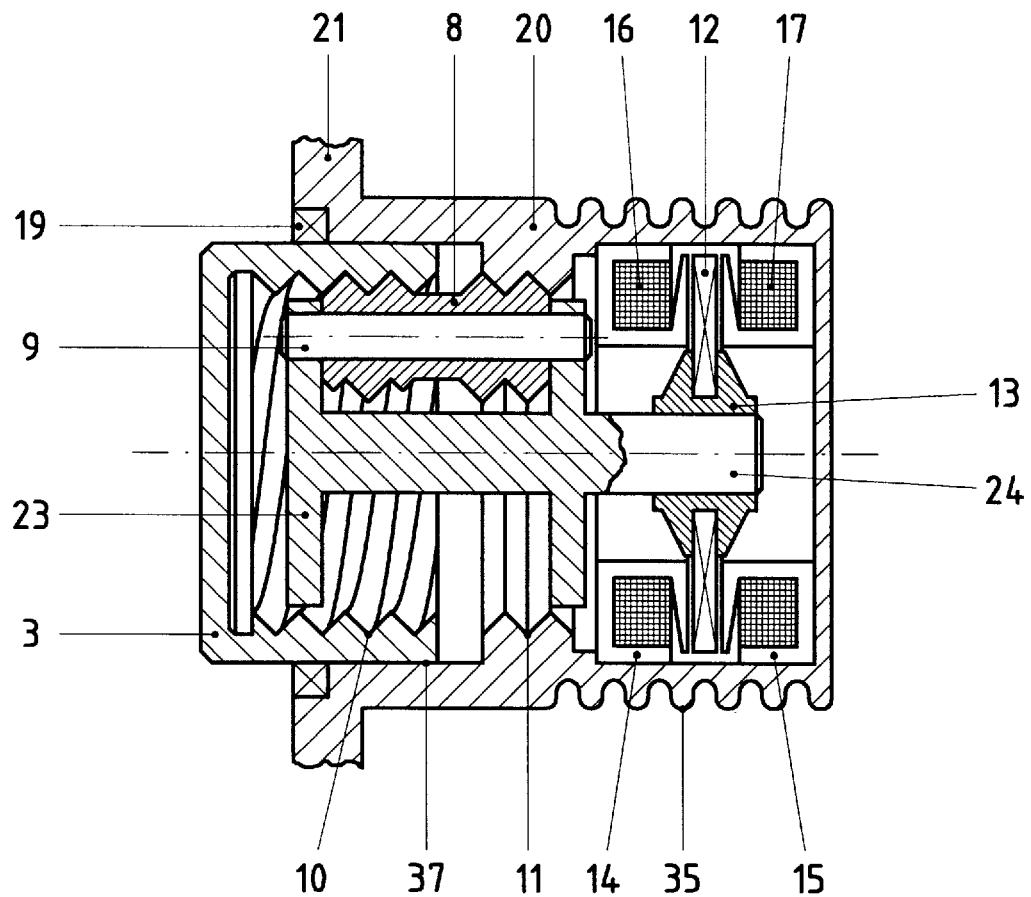
FIG. 2 shows a variation of the illustrated embodiment shown in FIG. 1.

In the drawing FIG. 2 a variation of the illustrative embodiment shown in FIG. 1 is introduced. In the housing 20 with flange 21 a cylindrical bore 37 is machined in which with the piston 3 forms a sliding fit. As before the piston is sealed with respect to the housing with the seal 19. Also in this area of the electrical motor outwardly projecting cooling fins 35 are provided. The planet rollers (8) are mounted in the cage 23 with bolts (9). From the cage a shaft end 24 transitions towards the right to serve for coupling of the electrical motor. The piston 3 at the same time is shaped as ring wheel with an internal three start threading 10, while in the housing 20 a notch/ridge collective 11 is formed. The notch/ridge collective on the right side of the planet rollers (8) rolls without play in the respective notch/ridge collective (11) of the housing, so that a stable mounting in all directions exists, which in principle makes possible the dispensing of a supplemental mounting or supporting of the cage shaft 24.

Figure 3:
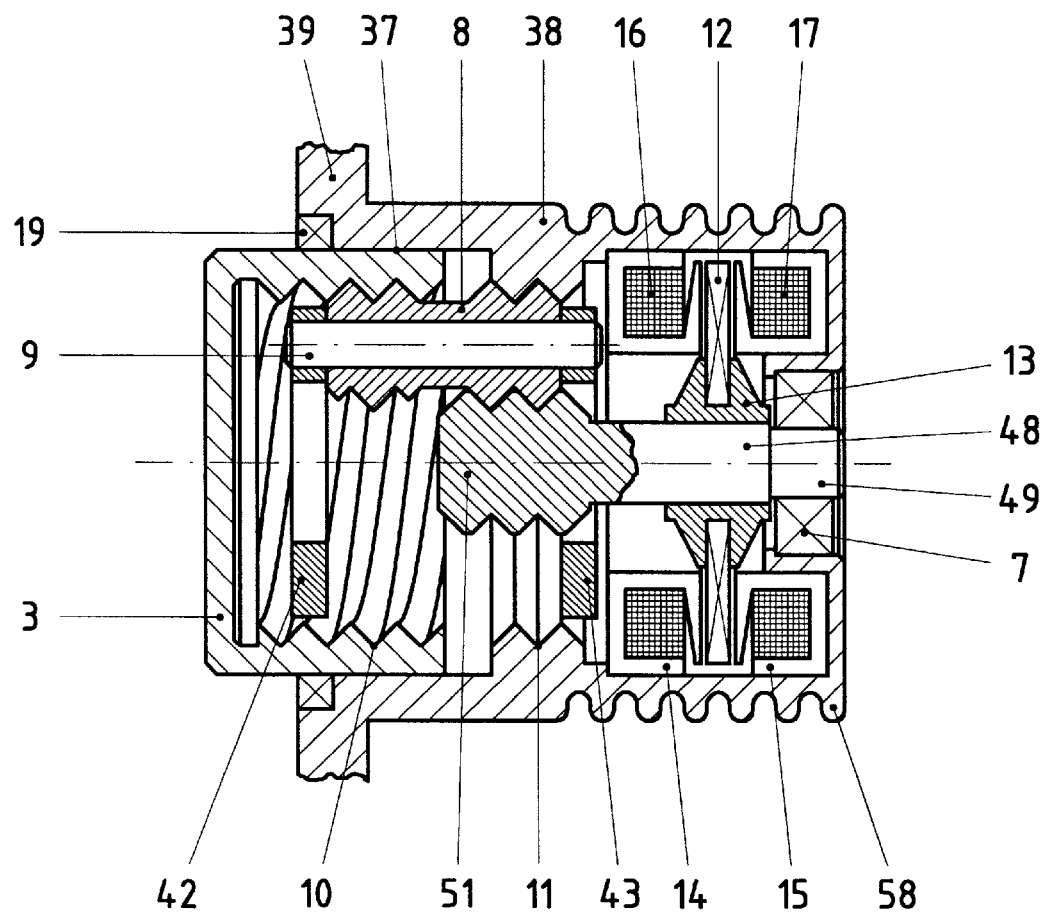
FIG. 3 shows a further variation of the invention wherein the cage is not constructed as a single piece, but rather is comprised of cage disks.

A further variation or development of the above described illustrative embodiment is represented in FIG. 3. Herein the housing 38 with cooling fins 58 and flange 39, piston 3 with seal 19, fitting 37, planet roller 8 with bolt 9, triple start threading 10 and notch/ridge collective 11 correspond widely with the respective construction components of FIGS. 1 and 2. The cage is here however not constructed as a single piece, but rather is comprised of cage disks 42 and 43. In principle, these cage disks are connectable by studs for example by screwing or riveting or are also capable of being produced as a single piece. However, sufficient free space must remain in the center of the so-formed cage for the provision of a sun gear. In the shown example the sun gear is formed of a double ridge wheel 51 corresponding with a notch/ridge of the planet roller which is part of a drive element 48. This transitions to a shaft projection 49, which for its part is mounted by means of roller bearings 7 in the housing 38.

With regard to the fundamental manner of functioning of the drive system there is provided in the following a description with greater detail. If the cage 4, 23 is rotated clockwise, so the special planet rollers 8, are taken along by frictional engagement between their right side lying ridge/notch pairs and the corresponding inner profiles 11, of the housing 1, 20, being rolled with their own working circle on those of the respective inner profiles 11, while rotating themselves in a counterclockwise direction. The axial position of the planet rollers remains thereby without change. At the same time the left side lying (single threaded) thread of the planet rollers is rolling with frictional engagement upon the inner thread 10, of the piston 3. When the roller working circle of the two involved rotating groups are selected to be equal sized, there results between the housing 1, 20 and the piston 3, no angular displacement. The piston thus does not exhibit a rotation movement, not even when a rotative abutment for example in the form of a notch guide or the like is missing. The particular function in accordance with this purpose is also then attained, when the special planet rollers are directly driven, for example as shown or represented in FIG. 3.

The thread start number relationship between the threading of the planet rollers (8) and the inner threading 10, of the piston must logically always correspond to a whole number and is preferably adapted to the diameter relationship, which above all is necessary when very small resulting total flank leads are required. Since the smallest number of thread starts for the individual planetary roller corresponds to one, then for example the thread start number for the inner threading 10, can be set at three, when the working diameter of the planet roller is approximately a third of that working circle diameter. This relationship was also selected for the representative embodiments. In the cage there are then for example easily three or more planet rollers installable. In principle one would always try to incorporate the greatest number of planet rollers in the device.

If then the diameter relationship between the roller working circles of the threading of the planet rollers (8) and the inner threading 10, departing from the whole number thread start relationship of these two rolling partners is selected, so there results per revolution of the cage an axial displacement of the piston according to the following relationship:

$$z = \left[1 - \frac{G_H \cdot D_P}{G_P \cdot D_H}\right] \cdot s$$

Wherein:
z=outward movement of the piston in millimeter per clockwise rotating drive revolution
$G_H$=thread start number of the internal threading
$G_P$=thread start number of the planet roller
$D_H$=working circle diameter of the internal threading
$D_P$=working circle diameter of the planet roller
S=flank pitch in millimeter On the basis of the formula it becomes clear, that for example in a thread start number relationship of 3 to 1 and an equal relationship of the working circle diameters of 3 to 1 the axial advance of the piston is zero. If one employs the working circle diameter of 45 mm for the internal threading and 14.25 mm for the planet roller according to the figure, so there results on the basis of the thread start number relationship of 3 to 1 and the flank pitch of 6 mm an axial displacement of the piston of 0.3 mm per drive revolution. Since the valance is positive, there occurs in the case of a right-hand-thread the axial movement towards outwards.

In principle for the roller drive according to the present invention one can employ a right as well as a left-hand-thread. Likewise, there exists the possibility of selecting the roller body diameter of the special planet rollers in their relationship to the internal thread to be slightly larger or slightly smaller than would correspond to the thread start number relationship. According to the further above given formula there results therefrom a respective reversal of the rotation direction. However, a special planet roller which is larger in relative relationship provides an increased security against slippage, since during a blockage of the special planet roller the piston must be displaced with the velocity of the flank lead much faster towards outwards (for example, against the frame carrier).

For the drive of the roller mechanism there is employed in the three examples a respective identical electrical disk armature motor. Its rotor is comprised of a disk shaped magnet 12, 29, 52 with an axial multi-polar magnetization. It is secured on the cage shaft by means of a carrier 13, 30, 53 of non-magnetizable material. The corresponding stator is constructed of two parts, which face the side faces of the disk shaped magnet via an air gap. The respective magnet yoke 14/15, 31/32, 54/55 extends in stator teeth, which correspond in their pole number with those of the disk shaped magnet. The magnetic excitation of the two stator halves is achieved for example by means of ring coils 16/17, 33/34, 56/57, using a two phase supply.

Generally for the rotative drive of the system the most various electromotors are employable, for example direct current, alternating current, step motors or the like, and in certain cases also rotating magnets with limited rotation angles. The actual braking force is adjustable herein for example via the regulation of the current strength, a change in the frequency, or via utilization of a synchronization with variable impulse/pause time relationship. Likewise there can be employed a control loop with corresponding or appropriate sensors.

With the invention further modifications of the system are made available. So it is proposed, to employ as rotative drive a rotating magnet and to couple this via a free wheel (for example a loop spring or locking body free wheel) with the roller drive mechanism. The angle of rotation of the rotation magnet is then responsible for the actual brake stroke, while the necessary stroke for balancing of the abrasion on the brake linings and brake disks is automatically compensatable by the free wheeling.

As further modifications there is offered, that the shaft of the drive motor is outfitted with a spur or helical gear wheel in the form of a sun gear, and this is permitted to come into engagement with an additional tooth system of the planet rollers. This tooth system is arrangeable either axially shifted upon the planet roller or can be formed into the roller heads of the planet rollers. The drive stage formed as a quasi-planetary gear achieves not only an additional gear reduction, but rather reduces also the inertial mass moment of the entire system. Thereby the response speed of the brake can be increased. The teeth of the sun gear which engage with the teeth of the special planet rollers are in the here-proposed construction relied upon simultaneously for harmonization of the rotation angle amount of the special planet rollers. Without the quasi-planetary gear stage a rotation angle related equilibrium of the special planet rollers establishes itself automatically.

The embodiment according to the above proposal is capable of further development to a true planetary gear, when a toothed internal gear is supplementally provided on the housing 1, 20, 38. The toothed sun gear of the driver engages then in the teeth of the planet rollers, while these for their part engage in the toothed internal gear.

For ensuring of the frictional engagement which is indispensable for the function of the system it is further proposed that at least one of the special planet rollers is made radially adjustable or displaceable, or to pretension in the roller area by provision of, for example, a plate spring and a ring axially upon the non-force transmitting side.

The sun gear can further, based upon the embodiment according to FIG. 3, also be constructed as a flat cylinder (for example hollow cylinder) and run upon the tooth tips of the planet rollers, wherein these then are preferably flattened. A hollow cylinder of this type is then for example pretensionable, in that it is slitted screw-like linearly along the corresponding length with great lead or pitch. When thereby the cylinder length is to extend itself into the thread area of the planet rollers, it is recommended, to carry out the helical slit of the hollow cylinder counter-phasic to the path direction of the planet roller threading and with diverging lead or pitch, so that an eventual lock effect is precluded in the case of rolling over.

The inventive linear actuator device can also in an extremely simple manner be realized for example for the hand adjustment on a machine or a machine element, when the motor drive side is replaced by a simple hand wheel. Then displacement processes with high feel or feedback requiring higher force are easily attainable.

With the invention there is overall provided a linear actuator, which for a whole variety of applications is usable and capable of being produced in the most various embodiments. In particular it appears to be capable of satisfying in an optimal manner the requirements as a construction element of an electrical operated brake system of an automobile. It possesses because of the purely roller engagement an exceptionally high operating efficiency and is comprised of a relatively small number of construction components and thus can be realized in a very compact construction size. Thus, it can be produced at very low costs. Therewith among other things the way is opened to utilize the advantages of the electric or as the case may be electronic technology in an automobile also in the area of the brake system.

What is claimed is:

1. Device for the conversion of a rotational movement in a translational movement, comprised of:

a first internally threaded ring wheel;

a second ring wheel having a pitchless internal surface; and a roller drive unit with at least one planet roller rolling within said first internally threaded ring wheel, wherein said at least one planet roller at least in a first section exhibits an outer threading and in a second section at least a pitchless circumscribing working surface, whereby during the orbiting of the planet roller its outer threading rolls upon the inner threading of said first ring wheel and wherein at the same time its pitchless circumscribing working surface rolls upon the pitchless internal circumscribing working surface of said second ring wheel, wherein the relationship between the working circle diameter of the outer threading of the planet roller and the working circle diameter of the internal threading of the ring wheel is not the same as the thread start relationship between the outer threading of the planet roller and the inner threading of the ring wheel, resulting in an axial relative movement between the planet roller and the internally threaded ring wheel during the rolling process.

2. Device according to claim 1, wherein the respective working circles between the planet roller and the internally threaded ring wheel, ring wheel with pitchless circumscribing working surface or both possess the same diameter, so that during the orbiting of the planet rollers no angular displacement results between both ring wheels.

3. Device for the conversion of a rotational into a translational movement, comprised of a roller drive mechanism with at least one planet roller running about a threaded spindle, wherein the planet roller at least in a first section exhibits an outer threading and in a second section at least a pitchless circumscribing working surface, wherein during the orbiting of this planet roller its outer threading rolls upon the outer threading of the thread spindle and at the same time its pitchless circumscribing working surface rolls upon the pitchless circumscribing working surface of an axis projection, wherein the relationship between the working circle diameter of the outer threading of the planet rollers and the working circle diameter of the outer threading of the spindle is unequal to the thread start number relationship between the outer threading of the planet roller and the outer threading of the spindle, resulting in an axial relative movement between the planet roller and the spindle during the rolling process.

4. Device according to claim 3, wherein the respective working circles between the planet rollers and the threaded spindle, respectively the axle projection with pitchless circumscribing working surface or notch/rib profiling possess the same diameter, so that during orbiting of the planet rollers no angular displacement results between the threaded spindle and the axis projection.

5. Device according to one of the preceding claims, wherein the planet roller(s) are rotatably mounted in a cage (44, 23, 42/43) in parallel to the axis thereof.

6. Device according to claim 5, wherein the rotative drive is fixed against rotation and connected with the cage (4, 23, 42/43).

7. Device according to claim 5, wherein the planet roller (s) is/are provided additionally with an external gear toothing and is/are driven by a sun gear with corresponding toothing which is connected to the rotative drive.

8. Device according to claim 5, wherein the planet roller (s) is/are rotatively driven via its/their notch/rib profiling by a sun gear (51) with a corresponding notch/rib profiling.

9. Device according to claim 5, wherein the planet roller (s) are rotatively driven via its/their outer diameter by means of an in principle cylindrical shaped sun gear.

10. Device according to claim 5, wherein the planet roller(s) for the purpose of harmonizing their relative rotational position supplementally is/are provided with an external gear toothing, which engages in a supplemental internal gearing of the ring wheel with the notch/rib profiling, wherein the respective working circles between the two gearings and the two notch/rib profilings possess the same diameters.

11. Device according to claim 5, wherein the planet roller(s) supplementally is/are provided with an external gear toothing, which engages in a supplemental internal gearing of the ring wheel with the notch/rib profiling, wherein the respective working circles between the two gearings and the two notch/rib profilings possess the same diameters, and the planet roller(s) is/are driven via a sun gear with corresponding toothing, which is connected to the rotative drive.

12. Device according to claim 1, wherein the ring wheel with pitchless circumscribing working surface or as the case may be notch/rib profiling (11, 28, 47) is fixedly connected with the housing (1, 20, 38) of the device.

13. Device according to claim 1, wherein the ring wheel provided with inner threading (10, 27, 46) is part of an axially moveable piston (3, 23, 40).

14. Device according to claim 1, wherein the planet roller is radially adjustable, in order to achieve a freedom from play or as the case may be to ensure a frictional connection between the respective working partners by means of a corresponding pressure force.

15. Device according to claim 1, wherein the only planet roller, or as the case may be at least one of multiple planet rollers is pretensioned in axial direction against the pitchless circumscribing working surface, using assisting means.

16. Device according to claim 1, wherein a free wheel in integrated within the force transmission train between drive and the other working parts.

17. Device according claim 1, wherein the drive is comprised of a hand wheel.

18. Device according to claim 1, wherein the drive achieves via an electric motor.

19. Device according to claim 16, wherein the drive is comprised of a rotating magnet.

20. A vehicle comprising as component of a brake system a device for the conversion of a rotational movement in a translational movement, comprised of:
    a first internally threaded ring wheel;
    a second ring wheel having a pitchless internal surface; and
    a roller drive unit with at least one planet roller rolling within said first internally threaded ring wheel, wherein said at least one planet roller at least in a first section exhibits an outer threading and in a second section at least a pitchless circumscribing working surface, whereby during the orbiting of the planet roller its outer threading rolls upon the inner threading of said first ring wheel and wherein at the same time its pitchless circumscribing working surface rolls upon the pitchless internal circumscribing working surface of said second ring wheel, wherein the relationship between the working circle diameter of the outer threading of the planet roller and the working circle diameter of the internal threading of the ring wheel is not the same as the thread start relationship between the outer threading of the planet roller and the inner threading of the ring wheel, resulting in an axial relative movement between the planet roller and the internally threaded ring wheel during the rolling process.

21. Device according to claim 18, wherein said electric motor is an asynchronous, direct current, reluctance, step or disk motor.

* * * * *